United States Patent
Roehr

[15] 3,660,001
[45] May 2, 1972

[54] MOLDING APPARATUS WITH POSITIVE COLLAPSE CORE

[72] Inventor: George L. Roehr, 225 Crescent Street, Lincoln, Mass. 02154

[22] Filed: Nov. 6, 1968

[21] Appl. No.: 773,817

[52] U.S. Cl. ..............................425/396, 29/421, 425/403, 425/438
[51] Int. Cl. .........................................B29f 1/14
[58] Field of Search .........................18/2 RS, DIG. 5, 14, 58; 27/421

[56] References Cited

UNITED STATES PATENTS 3,125,801  3/1964  Fields........................................18/2 X
3,247,548  4/1966  Fields et al................................18/2 X
3,373,479  3/1968  Watt et al.................................29/421

*Primary Examiner*—William S. Lawson
*Attorney*—Spector and Alster

[57] ABSTRACT

Apparatus for molding plastic articles having an undercut, rib, thread, or the like deformation comprises a core divided longitudinally into sections having molding ends that are radially shiftable to and from an expanded article-molding position and a contracted article-release position. A center pin holds the sections expanded. The core may be shifted axially resulting in the center pin being withdrawn from support of the molding ends of the sections. This causes a cam ring that encircles the sections to urge the sections radially inwardly by the engagement of cam-follower lugs on the sections to collapse positively the sections without interference from the pin.

7 Claims, 5 Drawing Figures

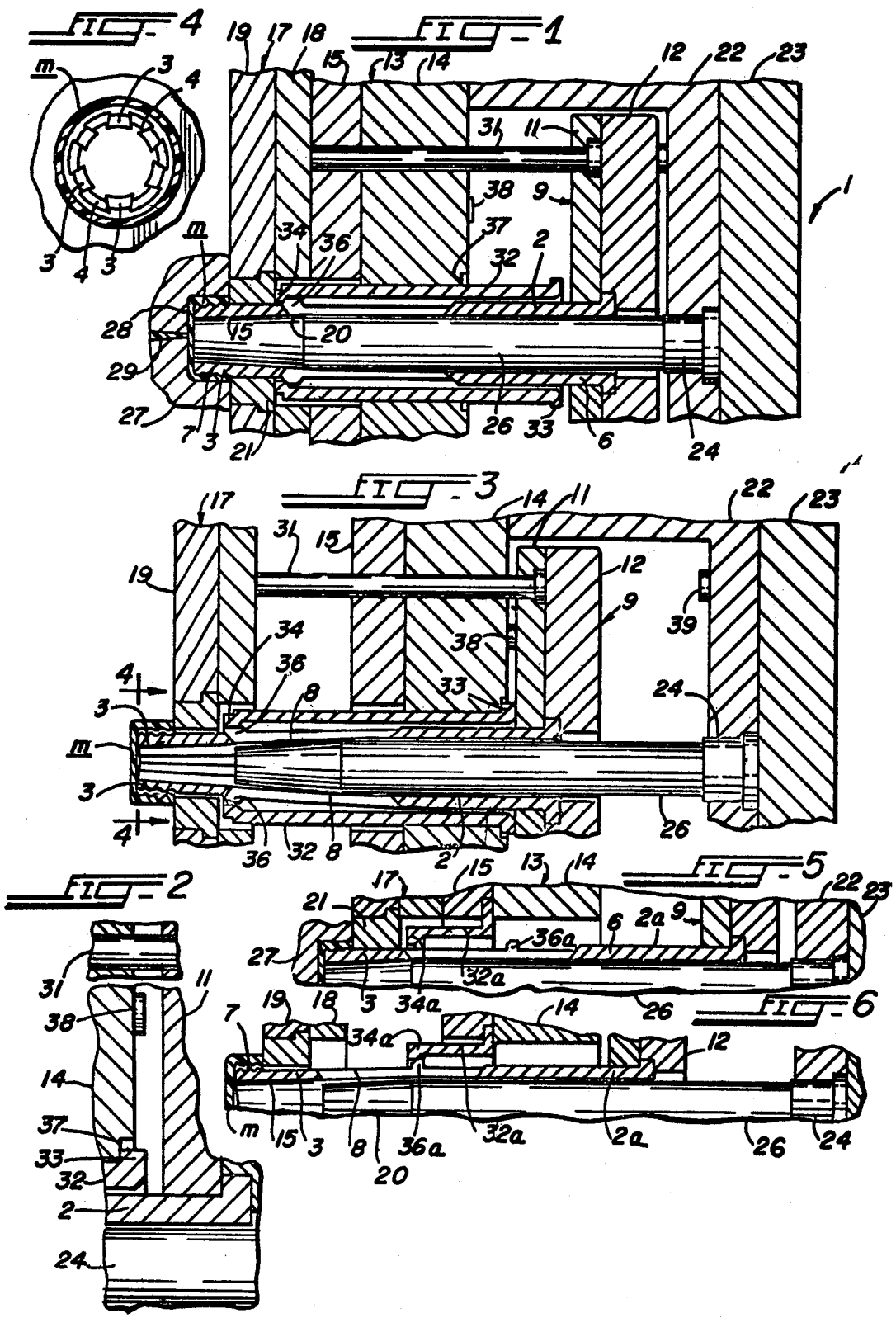

MOLDING APPARATUS WITH POSITIVE COLLAPSE CORE

This invention relates to apparatus for molding plastic articles and more particularly to molding apparatus having a positively collapsible core.

It is an object of this invention to provide a molding apparatus having a radially contractable and expandable core for molding an article having a radial deformation, such as a thread, groove, rib, or the like, and wherein the apparatus provides for a positive contraction or collapse of the core to clear the molded deformation so that the molded article may be readily stripped from the core. The positive collapse of the core insures that the core will retract sufficiently under a variety of molding conditions, for instance where the plastic being molded has a high degree of shrinkage during cooling.

It is a further object of this invention to provide apparatus of the type stated in which the core has sections that are movable to and from expanded article-molding positions and contracted article-release positions. The sections are normally themselves spring-biased to their collapsed positions and there is a core pin for supporting the sections in their expanded positions. The sections have outwardly projecting radial lugs or follower elements which are engageable by a cam ring on a sleeve surrounding the core so that when the core is moved to retract the core pin from the molding end of the core, the cam ring positively biases the core sections to their fully collapsed positions without having to rely on the resiliency of the core sections. The core pin is sufficiently retracted relative to the core so that the positive collapse is substantially without interference from the core pin. The cam ring is part of a sleeve that is mounted on a fixed support plate forming part of the apparatus. In one form of the invention the sleeve is axially movable with the core as the core pin is being brought out of supporting engagement with the core sections, but the sleeve is retained as the core approaches its final axial position so that a small amount of additional core movement causes the cam ring to urge positively the core sections to their collapsed positions. In another form of the invention the sleeve is rigidly mounted in the support plate and the lugs on the core sections come into engagement with the cam ring portion of the sleeve as the core approaches its aforesaid final axial position.

The attainment of the above and other objects of this invention will be apparent from the following description taken in conjunction with the accompanying drawing forming a part thereof.

In the drawing wherein like reference characters indicate like parts throughout:

FIG. 1 is a fragmentary sectional view of molding apparatus constructed in accordance with and embodying the present invention, the apparatus being shown in the article-molding condition;

FIG. 2 is a fragmentary sectional view of a portion of FIG. 1 but showing the core partially retracted from the core pin;

FIG. 3 is a sectional view similar to FIG. 1 but showing the core collapsed and preparatory to stripping the article therefrom;

FIG. 4 is a fragmentary sectional view taken along line 4—4 of FIG. 3; and

FIGS. 5 and 6 are fragmentary sectional views similar to FIGS. 1 and 3, respectively, but showing another form of the invention.

Referring now in more detail and by reference characters to the drawing, 1 designates molding apparatus comprising a core 2 which may be substantially of the type shown and described in U.S. Pat. No. 3,247,548, the disclosure of which may be by reference incorporated herein. Suffice it to say, however, that the core is longitudinally divided into circumferentially disposed groups of sections, the sections 3 of one group being alternately disposed with respect to the sections 4 of the other group. The sections 3, 4 are fixed together at the base portion 6 of the core 2 and the opposite or free ends of the sections 3, 4 have external molding surfaces which may provide a deformation, such as thread 7, which extends peripherally continuously from one section to the next section when the core is expanded to its molding position. The longitudinal sides of the sections are constructed with radial overlaps such that when the sections are radially collapsed or retracted, as shown in FIGS. 3 and 4, one group of sections 3 will shift radially inwardly and provide clearance for the radial inward shifting of the other sections 4. The sections 3, 4 are resilient so that without internal support they tend to assume their collapsed positions. Between the molding ends of the core and the base portion 6, the sections 3, 4 are cut away to form longitudinal slots 8.

The base portion 6 is clamped in an ejector plate assembly 9 comprising plates 11, 12 so that the core 2 projects loosely through a fixed support plate assembly 13 comprising plates 14, 15. The core 2 also projects through a stripper plate assembly 17 comprising plates 18, 19. An insert 21 is provided in the plate 19 and is retained therein by the plate 18. The insert 21 seals against the exterior surfaces of the sections in the molding position, as shown in FIG. 1.

Rigid with respect to the support plate assembly 13 are pin-supported plates 22, 23 that clamp the enlarged end 24 of core pin 26. The core pin 26 is adapted to extend coaxially in the core 2 and in the molding position of the core 2 is flush with the molding end of the core, supporting the core sections 3, 4 against collapse. The interior surfaces 15 of the core sections 3, 4 and the exterior surface portion 20 of the core pin 26 are correspondingly tapered appropriate amounts so that when the core 2 is shifted to the position shown in FIG. 2 to retract the core pin 26 from the molding ends of the core sections, the core sections have clearance with the core pin for radial inward collapse.

A mold member 27 having a cavity 28 and a gate 29 cooperates with the end of the core 2 to form a molded article $m$, such as a threaded cap.

Mounted in the ejector plate assembly 9 are one or more pins 31 the ends of which abut the stripper plate assembly 17. When the stripper plate assembly 17 is in the position shown in FIG. 3 and is moved to return it to the position shown in FIG. 1, the pin 31 will cause the ejector plate assembly 9 to move to the right and carry with the core 2.

Telescoped over the core 2 and axially movable in the support plate assembly 13 is a sleeve 32 having at one end a radially outwardly turned flange 33 and at its other end a radially inwardly turned cam ring 34. The cam ring 34 abuts radial lugs or follower elements 36 on each of the core sections 3, 4 so that the sleeve 32 is carried with the core 2 when the latter moves to the left from the position shown in FIG. 1 to that shown in FIG. 2 until the flange 33 abuts an axial shoulder 37 on the support plate assembly 13 to stop further movement to the left of the sleeve 32.

With the molding of the article $m$ having been completed as shown in FIG. 1, the mold member 27 is shifted to the left to clear the molded piece $m$. Thereafter the ejector plate assembly 9 is driven from its position abutting the stop 39 on plate 22 toward the left carrying with it the core 2 and stripper plate assembly 17, the latter being actuated by the pins 31. The sleeve 32 is also carried with the core 2 since the minimum diameter of the cam ring 34 is less than the diameter across the lugs 36. This movement of the core 2 results in the core pin 26 being relieved from supporting relationship of the core sections 3, 4, but the sections do not always collapse as a result of their own spring action.

As the core 2 and ejector plate assembly 9 reach the positions shown in FIG. 2, the flange 33 will abut the shoulder 37 stopping the sleeve 32. However, the core 2 and ejector plate assembly 9 continue to move toward the left until the plate 11 abuts the stop 38 on the support plate 14, as shown in FIG. 3. During the movement of the core from the position of FIG. 2 to that of FIG. 3, the lugs 36 will ride under the cam ring 34 and positively collapse the segments 3, 4 so that the deformation 7 radially clears the corresponding molded deformation on the article $m$. By the time the core 2 is substantially at the position shown in FIG. 3, there is sufficient radial clearance between the sections 3, 4 and the core pin 26 so that the core pin 26 does not interfere with full positive collapse of the sections 3, 4.

With the sections 3, 4 collapsed, the stripper plate assembly 17 may be moved to the left from the position of FIG. 2 to that of FIG. 3 to strip the article m from the core 2. Thereafter the stripper plate assembly 17, ejector plate assembly 9 and core 2 may be returned to the positions shown in FIG. 1 for another molding operation. The sleeve 32 is returned with the core 2 since the end of the sleeve 32 is moved to the right as a result of engagement with the insert 21. The power mechanisms for moving the assemblies 9, 17 and the mold member 27 are conventional and are therefore not shown or described herein.

In another form of the invention shown in FIGS. 5 and 6 the construction is similar to that previously described except that the sleeve 32a is shorter than the sleeve 32 and the sleeve 32a is fixed by being clamped in the support plate assembly 13. FIG. 5 shows the apparatus in the article-molding position and thus corresponds to FIG. 1, while FIG. 6 corresponds to the collapsed position shown in FIG. 3. Also, the circumferentially spaced follower elements or lugs 36a on the core sections 3, 4 are more remote from the molding end of the core 2a than is the case in the core 2 of FIGS. 1 and 2.

As the core 2a, ejector plate assembly 9 and stripper plate assembly 17 are moved to the left (FIG. 5) the core pin 26 is relieved from supporting engagement with the core sections 3, 4 and the lugs 36a are urged into engagement with the cam ring 34a of the fixed sleeve 32a causing the sections 3,4 to be cammed radially inwardly for full positive collapse. The axial positions of the lugs 36a are such that the core pin 26 is withdrawn sufficiently so that the sections 3, 4 can fully collapse and not be blocked from full collapse by the pin 26. Thus in the collapsed position of FIG. 6 there is preferably slight radial clearance between the sections 3, 4 and the core pin 26.

The precise constructions herein shown are merely illustrative of the principles of the invention.

What is considered new and sought to be secured by Letters Patent is:

1. Apparatus for molding an article comprising a core having molding surface sections that are movable with respect to one another and in a direction radially of the core from an extended molding position to a contracted article-release position, means fixing one end of each section against relative movement while the opposite ends are movable between their extended and contracted positions, said sections in the extended positions abutting at said opposite ends to form substantially a peripherally continuous molding surface, means within said sections for supporting the sections in their extended positions, means providing relative axial movement between the core and said section-supporting means for causing retraction of said supporting means from said opposite ends of the sections and radial clearance between said sections and said supporting means, and means responsive to said relative movement for positively urging said sections radially inwardly to their contracted positions substantially without supporting interference from said supporting means; said positively urging means comprising radially outwardly projecting follower elements on said sections and means telescoped over said sections and having radially inwardly extending cam means for engagement with said follower elements.

2. Apparatus according to claim 1 in which said telescoped means is movable with said core upon an initial relative axial movement of the core and supporting means and is held against movement with the core upon an additional amount of axial movement of the core, said cam means biasing said follower means radially inwardly during said additional amount of movement.

3. Apparatus for molding an article comprising a core having molding surface sections that are movable with respect to one another from an article-forming position in which the adjacent sections are abutting and form a continuous radial deformation from one section to the next section to a contracted position in which the adjacent sections are radially inwardly shifted, the sections having radially interfering sides such that the radial inward shifting of one group of sections provides clearance for the radial inward shifting of the remaining sections, a pin within said sections for supporting the sections in their extended positions, means including an ejector plate for fixing one end of each section against relative movement while the opposite ends are movable between their extended and contracted positions, said ejector plate and core being movable in unison and relative to said pin to bring said pin into and out of said supporting engagement with said sections, a stripper plate spaced from said ejector plate for removing a molded article from the core, means for moving said ejector plate with said stripper plate, a support plate through which said core projects, a sleeve mounted in said support plate and telescoped with said core, said sleeve having a cam portion, and follower means on said sections and biased by said cam portion for positively urging said sections radially inwardly to their contracted positions substantially without supporting interference from said pin upon movement of said ejector plate in the direction to bring said pin out of said supporting engagement with said sections.

4. Apparatus according to claim 3 in which said sleeve is fixed in said support plate.

5. Apparatus according to claim 3 in which said sleeve is axially slidable in said support plate and movable with said core over one portion of the movement of said core in the direction to withdraw said pin from said supporting engagement, and said sleeve and support plate having cooperating means retaining the sleeve against axial movement for another portion of said core movement for effecting said positive urging during said other portion of the core movement.

6. Apparatus according to claim 1 having means mounting said telescoped means in a predetermined position with respect to said section-supporting means, and said means for providing relative axial movement between the core and the supporting means moves the core to bring said follower elements into following engagement with said cam means.

7. Apparatus according to claim 1 wherein the outwardly projecting follower elements on said molding surface sections are substantially farther from said one end of each section than they are from the opposite end of each that together form the continuous molding surface.

* * * * *